Dec. 18, 1923.

R. E. PYE 1,478,059

ANTISKID DEVICE FOR PNEUMATIC TIRES

Filed Nov. 11, 1919   3 Sheets-Sheet 1

INVENTOR
Robert E. Pye
BY
Samuel E. Darby
ATTORNEY

Dec. 18, 1923.
R. E. PYE
1,478,059
ANTISKID DEVICE FOR PNEUMATIC TIRES
Filed Nov. 11, 1919  3 Sheets-Sheet 2
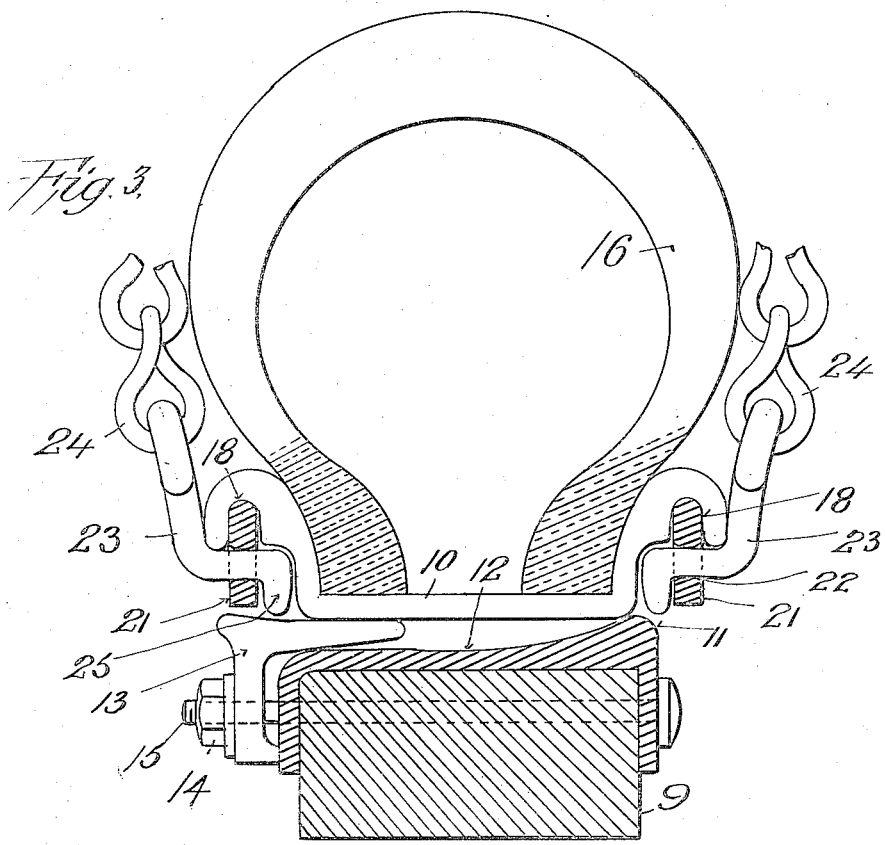
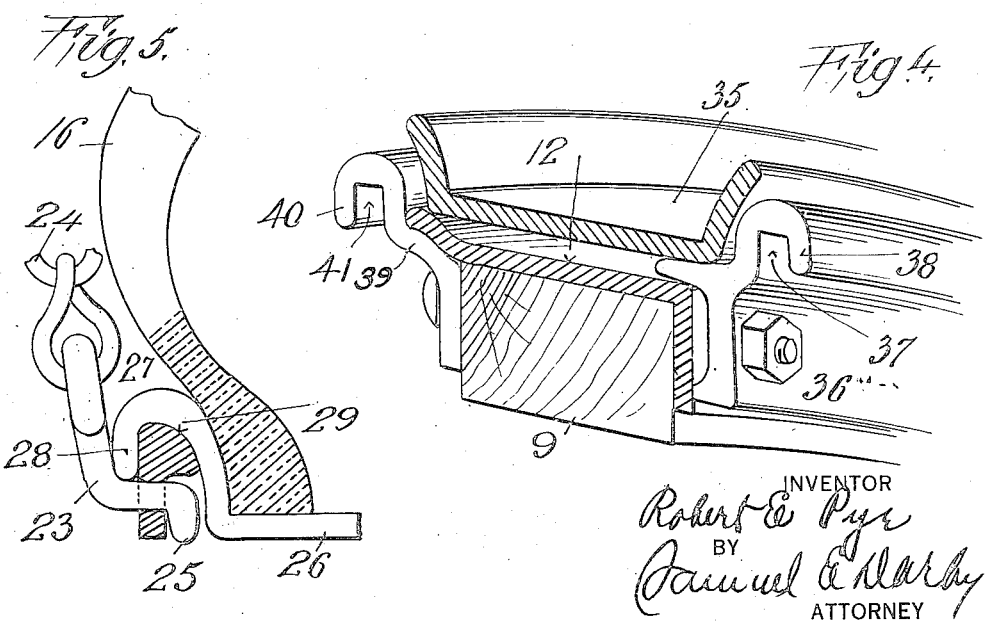
INVENTOR
Robert E. Pye
BY
Samuel E. Darby
ATTORNEY

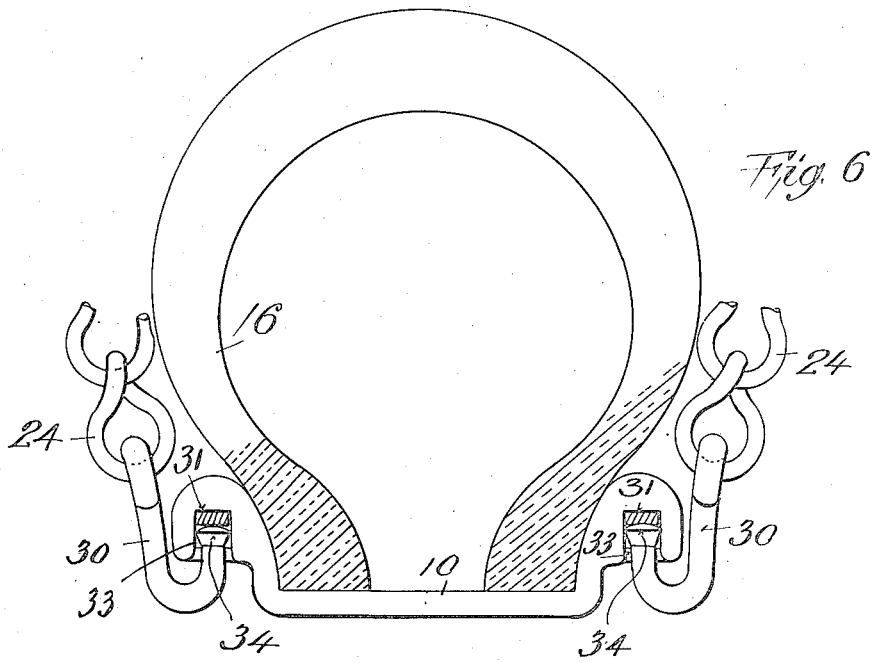
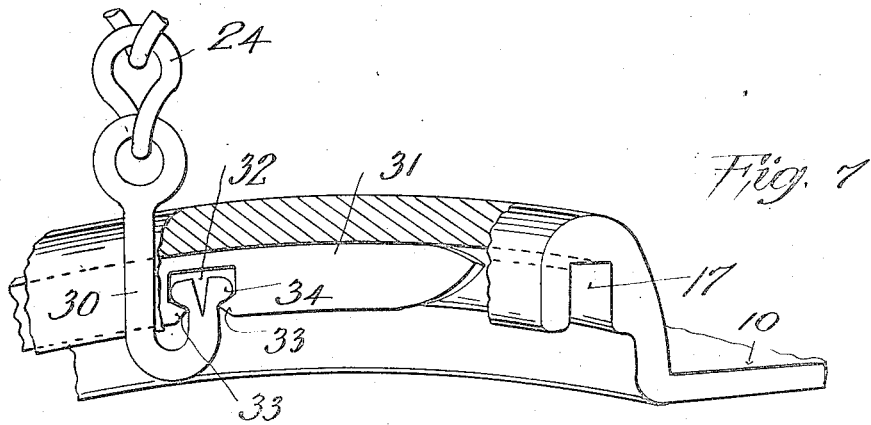

Patented Dec. 18, 1923.

1,478,059

UNITED STATES PATENT OFFICE.

ROBERT E. PYE, OF NEW YORK, N. Y.

ANTISKID DEVICE FOR PNEUMATIC TIRES.

Application filed November 11, 1919. Serial No. 337,371.

*To all whom it may concern:*

Be it known that I, ROBERT E. PYE, a citizen of the United States, residing at New York city, county and State of New York, have made a certain new and useful Invention in Antiskid Devices for Pneumatic Tires, of which the following is a specification.

One object of my invention is to provide an anti-skid device for vehicle tires which is simple in construction, efficient in operation, economical to manufacture and easily applied to or detached from position for use.

A further object of the invention is to provide an anti-skid device for vehicle tires of the type wherein one or more tread engaging members may be attached or detached independently of the others, and wherein provision is made to adapt the tread members to creep about the periphery of the tire when in use, especially where such anti-skid device is employed in connection with pneumatic tires.

Other objects of the invention will appear more fully hereinafter.

The invention consists substantially in the construction, combination, location and relative arrangement of parts, all as will be more fully hereinafter set forth, as illustrated in the accompanying drawings, and finally pointed out in the appended claims.

Referring to the drawings:—

Fig. 3 is a view in transverse section showing the application of an anti-skid device embodying my invention to a tire rim with a pneumatic tire applied thereto, and one form of detachably mounting the tire rim upon the felly of a wheel.

Fig. 4 is a broken view in perspective showing a modified arrangement adapted for the application of an anti-skid device embodying my invention as applied to a demountable rim structure.

Fig. 5 is a broken detail view showing a modified form of an annularly creeping member employed in connection with a practical embodiment of my invention.

Fig. 6 is a view similar to Fig. 3 showing a modified form of attachment of the tread engaging member to the annular creeping member of the anti-skid attachment.

Fig. 7 is a broken detail view in perspective, partly broken out and in section, showing the form of connection of the tread engaging member to the annular creeping member of the anti-skid attachment.

The same part is designated by the same reference numeral wherever it occurs throughout the several views.

Figure 1:
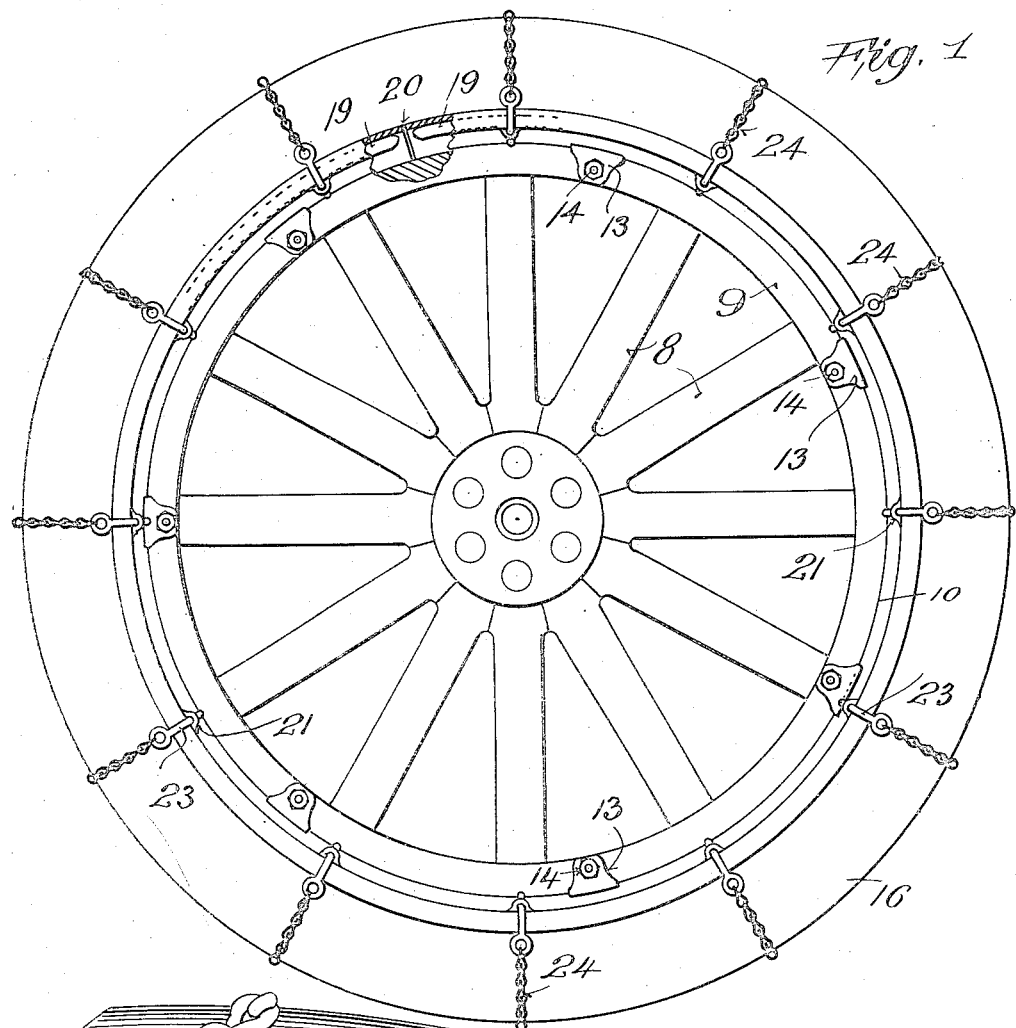
Fig. 1 is a view in side elevation of a vehicle wheel having a pneumatic tire, and showing the application thereto of an anti-skid structure embodying the principles of my invention.

In the drawings 8 designates a wheel which may be of any suitable construction. For illustrative purposes I have shown a wheel of the radial spoke type and carrying an annular felly member 9, but obviously my invention is not to be limited or restricted in its application to any specific structure of wheel. I employ an annular rim 10 carried by the wheel and which may be of any suitable structure and arrangement for application to the wheel. In one form suitable for use in connection with my invention the rim 10 is made removable from the felly 9. In this form the rim is clamped against a shoulder 11 formed on the plate 12 which is applied to the periphery of the wheel structure by means of detachable clips 13 held by nuts 14 applied to bolts 15 in the usual and well known manner.

Figure 2:
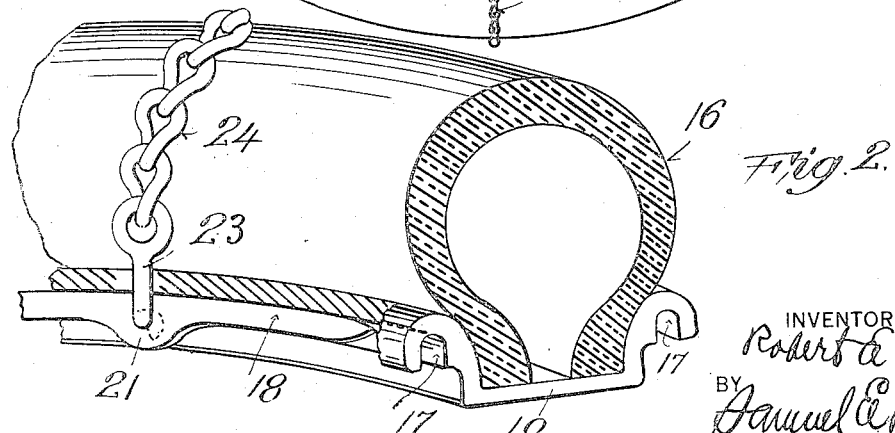
Fig. 2 is a broken detail view in perspective, parts in section transverse to the tire, and part in longitudinal section, showing a structure of attachment of an anti-skid arrangement embodying the principles of my invention.

In the form shown in Figs. 1, 2 and 3 the edge flanges of the rim member 10, between which flanges the pneumatic tire 16 is retained are formed with annular channels 17. These channels may be conveniently formed by turning over and downwardly the extreme edges of the edge flanges of the rim and by rolling the channels 17 therein. These channels 17 are designed to receive and form a guiding seat for an annular spring metal retaining ring 18. This ring is preferably a split ring, the ends 19 thereof terminating somewhat short of the complete peripheral length of the split rim member 10, the split in said rim member being indicated at 20 in Fig. 1. By constructing the annular ring 18 in this manner and of spring material said ring can be easily sprung into the guiding and receiving channels 18 and retained therein by its own spring tension, which, however, should not be sufficient to prevent said ring from creeping annularly in its guiding channel 17 in the rim flanges. At suitable intervals in the peripheral length of the ring member 18 said member is formed with projecting portions 21 through which openings 22 are formed. Detachably engaging in these openings are links 23 to which are secured chains or other flexible devices 24 which pass transversely across and exteriorly of the tire tread or shoe 16. That is, one end of the flexible connection 24 is secured to a link 23 on one side of the tire and the other end is secured to a link 23 on the opposite side of the tire. The links 23 are provided with headed angle ends 25 which are detachably inserted through the holes 22 in the projections 21 of the annular ring 18.

By this construction it will be seen that the anti-skid flexible connections 24 may be applied in anti-skid relation with respect to the tire or removed therefrom individually and independently of each other by simply passing the hooked and headed ends 25 thereof into the holes 22 of the annular rings 18 on opposite sides of the tire rim. These anti-skid devices 24 may be of sufficient length to permit the links 23 to be thus easily engaged in or detachable from the annular rings 18, and indeed a certain degree of looseness in mounting of the anti-skid devices 24 is desirable in order that they may efficiently perform their anti-skid functions when applied to a tire. By mounting the ring member 18 in the channels 17 with only a sufficient degree of resiliency to retain said rings in said channels the rings are permitted an annular creeping movement in their guiding channels 17 when the anti-skid connections 24 are in use, thus preventing the wear effects of said connections upon the tire from being confined to one particular place transversely across the tire, and hence preventing undue wear and possibly injury to the tire. The projections 21 on the annular rings 18 extend slightly below the terminal edge of the rim flanges as shown, thus facilitating the application of the anti-skid connections 24 thereto or the detachment thereof therefrom.

In the arrangement shown in Figs. 2 and 3 the channels 17 formed in the flanges of the rim are shaped with vertically substantially parallel side walls to form guiding surfaces for the annular rings 18. In its broadest scope, however, my invention is not to be limited or restricted to channels thus formed since the desired guiding functions may be accomplished by constructing the ring member itself of such shape in cross section or at suitable intervals to conform to the curved contour of the rim flanges. Such an arrangement is shown in Fig. 5 wherein the rim 26 is formed with the usual flange 27, the extreme edge of which is turned over or deflected to form a vertical guiding surface 28. In this instance the annular ring member is formed with an enlarger portion 29 in cross section or at suitable points which is shaped to conform to the exterior curvature of the flange 27 within the overhanging edge or lip portion 28. The important feature in this connection is the provision of means for guiding the annular ring members 18 in their annular creeping movements.

It will be observed that the channels in which the annular rings are received open radially inwardly or towards the hub of the wheel while the flexible connections 24 pass over the exterior tread surface of the tire and hence in a direction for any strain imposed thereon to draw or retain the annular rings in their guiding channels. The ring members 18 may form a more or less permanent part of the wheel rim. That is, they may be applied in and constantly retained by the channels 17 and merely the tire embracing members 24 detached and removed when the anti-skid function is not desired. It is obvious, however, that the rings 18 may also be detached and carried in the car and applied to their rim channels when the necessity for use of the anti-skid action arises.

In Figs. 6 and 7 I have shown a modified arrangement wherein instead of the ends 30 of the flexible anti-skid devices 24 being hooked through an opening formed in extensions of the flexible ring member which is seated in the channel 17 formed in the flanges of the rim 10, said flexible ring member shown at 31 is formed with slots 32 in its inner edge, which slots are formed with a restricted throat opening by means of projections 33 and the hook members 30 of the flexible anti-skid devices are formed with a split head or extremity 34 which may snap through the restricted throat openings for detachable attachment of said hook members 30 to the annularly creeping ring member 31. The hook members 30 in this arrangement may be easily and quickly applied to or removed from engagement with the annular ring member 31. In this arrangement the engagement of the hook members 30 with the annular ring member 31 is on the inner edge of the latter and the strain or pull exerted thereon by the anti-skid flexible connections 24 are more or less radial. This arrangement also permits a structure in which the hook members 30 lie closer to the tire rim and avoids the necessity for offsetting appreciably the engagement of the hook members with respect to the annular ring member 31.

In the structure above described a special construction of tire rim is necessitated in that the guiding channels for the annularly creeping ring member of the anti-skid devices are formed in the flanges of the rim.

My invention, however, in its broadest scope is not to be limited or restricted to a special construction of tire rim wherein the edge flanges of the rim are shaped to form the guiding channels referred to and within which the annular ring member is received. In other words, my invention contemplates a detachable anti-skid structure suitable for employment in connection with pneumatic tires wherein the ordinary forms of rims may be employed. In Fig. 4 I have shown an arrangement wherein an ordinary form of tire rim is shown at 35 and is retained in place on the felly 9 and felly ring 12 of any usual or ordinary wheel structure by means of an annular retaining ring 36 applied to one side surface of the felly structure in p'ace of the usual clips shown at 13 in Figs. 1 and 3, the annular channel 37 to receive and guide the annular creeping split ring member being formed in an overturned flange 38 of said retaining ring 36. Cooperating with the clamping ring member 36 and applied to the opposite side of the wheel felly structure is a corresponding ring member 39 having an overturned flange 40 in which is formed a guiding channel 41 to receive the other annular ring member of the anti-skid device.

From the foregoing description it will be understood that broadly my invention includes means capab'e of application to and detachable from pneumatic tires and which include at opposite sides of the tire anchorages for flexib'e cross connections between them, which connections loop over and transversely cross the exterior or tread surface of the tire, the whole thus constituting an anti-skid device. It will a'so be observed that the anti-skid device unit is so constructed and arranged as to be capable of creeping or traveling as a unit in a path coaxial with the wheel, the flexible cross connections between the anchorages disposed at opposite sides of the tire being arranged at fixed distances apart.

While I have described the anchorages on opposite sides of the tire as being of the same construction it is obvious that this is not essential and my invention is not to be limited or restricted in this respect. The essential feature is that the anchorages including the annular'y removable ring members should be capable of annular creeping movement and they should be suitably and properly retained and guided in such movement. As above indicated these members may be applied permanently to the rim or other felly structure, that is, it may not be necessary to detach and remove them when the anti-skid flexible cross connections are not required for use but only said flexible cross connections may be removed.

It is obvious that many modifications and variations in the details will readily occur to persons ski'led in the art and still fall within the spirit and scope of my invention. I do not desire therefore to be limited or restricted to the exact details shown and described, but having now set forth the objects and nature of my invention and various constructions embodying the principles thereof, what I claim as new and useful and of my own invention and desire to secure by Letters Patent is,—

1. In an anti-skid device for vehicle wheels, the combination with a tire and means including a tire rim for supporting the same, of annular ring members disposed at opposite sides of the tire and carried by said tire rim, and mounted for free annular movement, and flexible members to extend across the tread of the tire and detachably connected to said annu'ar ring members.

2. In an anti-skid device for vehicle wheels, the combination with a tire and means including a tire rim for supporting the same, of flexible members extending transversely across the tire tread, annular ring members disposed at opposite sides of the tire and carried by the tire rim and to which the ends of said flexib'e members are detachably connected, and channel ways in which said ring members are mounted for free annular movement.

3. In an anti-skid device for vehicle wheels, the combination with a tire and means including a tire rim for supporting the same upon the wheel, said rim having annular channels disposed at opposite sides of the tire, and having open sides presented towards the axis of rotation of the wheel, ring members fitting and guided in said channels, and flexib'e members extending across the tread surface of the tire and detachably connected at their ends to said ring members.

In testimony whereof I have hereunto set my hand on this 10th day of November, A. D. 1919.

ROBERT E. PYE.